Patented July 4, 1944

2,352,746

UNITED STATES PATENT OFFICE 2,352,746

INSECT REPELLENT

Ludwig W. Wasum, Jenkintown, Pa., assignor to Kessler Chemical Co., Inc., Philadelphia, Pa., a corporation of Pennsylvania No Drawing. Application May 8, 1943,
Serial No. 486,249

3 Claims. (Cl. 167—30)

This invention relates to an insect repellent and more particularly to an insect repellent which in various forms will be highly effective and, at the same time, may be applied to the skin without any harmful result.

The insect repellent according to this invention may be prepared in various forms, as solutions, pastes, emulsions, and the like, or it may be used direct, and it may be combined with an insecticide, if desired. It will be found highly efficient in repelling flies, greenheads, mosquitoes, and insects generally and lends itself to application to man and animals.

The repellent according to this invention, aside from its efficacy for the purpose intended, is characterized by the fact that it does not have the strong, unpleasant odor of repellents, such as citronella, pine oil, and the like, and does not produce the smarting effect when applied to the skin, particularly tender or sunburned skin, which is produced by repellents such as some of the essential oils and synthetic aromatic compounds, for example, benzoic, salicylic, phthalic, etc., acid esters.

As has been indicated, the repellent may be applied direct or in the form of a solution or lotion, a paste or cream, an emulsion, or the like.

The insect repellent according to this invention comprises from the broad standpoint 2-ethyl hexoic acid esters of cyclohexanol and substituted cyclohexanols. More specifically the esters may be diluted with a solvent or emulsified with water and may be combined with an insecticide.

The esters comprising the insect repellent according to this invention may be produced by esterifying cyclohexanol or a substituted cyclohexanol with 2-ethyl hexoic acid, following any well known procedure for effecting esterification.

By way of example, the esters may be produced by esterifying cyclohexanol, or a substituted cyclohexanol, with 2-ethyl hexoic acid.

The esters comprising the insect repellent according to this invention may be applied direct, but desirably will be applied in the form of a spray, lotion or cream by the addition of a solvent, or by emulsification with water.

For the formation of a solution for use as a spray or lotion any suitable solvent, for example, alcohol, a mineral oil, a vegetable oil, or the like, for the esters may be used. Thus, for example, insect repellent lotions for application to the skin may be made up on the following formulae:

Formula A

| | Parts |
|---|---|
| Methyl cyclohexyl 2-ethyl hexoate | 10–25 |
| Alcohol (ethyl, isopropyl) | 75–90 |

Formula B

| | Parts |
|---|---|
| Cyclohexyl 2-ethyl hexoate | 10–25 |
| Oil (white neutral mineral oil, olive oil) | 75–90 |

As further illustrative, a spray, adapted for the spraying of cattle and including an insecticide, may be made up on the following formula:

Formula C

| | Parts |
|---|---|
| Cyclohexyl 2-ethyl hexoate | 75–90 |
| Mineral oil, 80–85 Saybolt viscosity at 100° F., containing active principles from .25–2.0 lbs. of pyrethrum flowers | 10–25 |

When it is desired to include an insecticide, as in the above Formula C, the active principles of pyrethrum flowers, derris, cube, and the like, may be used.

As further illustrative, an insect repellent cream for application to the skin may be made up on the following formula:

Formula D

| | Parts |
|---|---|
| Cyclohexyl 2-ethyl hexoate | 25.0 |
| Stearic acid | 20.0 |
| Potassium hydroxide | .67 |
| Water | 54.33 |

To form the cream the ingredients according to the above Formula D are emulsified by any well known procedure.

The insect repellent according to this invention will be found to be highly efficient to repel mosquitoes, flies and other insects and to be applicable to man and animals without any harmful result.

It will be understood that where herein the term "cyclohexanol" is used, it is intended that the term shall be construed as including substituted cyclohexanols.

What I claim and desire to protect by Letters Patent is:

1. An insect repellent comprising cyclohexyl 2-ethyl hexoate.
2. An insect repellent comprising cyclohexyl 2-ethyl hexoate dissolved in a solvent.
3. An insect repellent comprising cyclohexyl 2-ethyl hexoate emulsified in water.

LUDWIG W. WASUM.